United States Patent
Cheng

[11] Patent Number: 6,000,674
[45] Date of Patent: Dec. 14, 1999

[54] RELIABLE FLUSH VALVE

[76] Inventor: Hong-Ming Cheng, 5F, No. 26, Lane 101, Hang-Chou S. Rd., Sec. 1, Taipei, Taiwan

[21] Appl. No.: 09/191,296

[22] Filed: Nov. 13, 1998

[51] Int. Cl.$^6$ .................................................. F16K 31/126
[52] U.S. Cl. .......................... 251/26; 251/30.02; 251/45; 137/545
[58] Field of Search .................................. 251/26, 30.02, 251/30.03, 45, 38, 30.01, 30.05; 137/545, 550

[56] References Cited

U.S. PATENT DOCUMENTS

| | | | |
|---|---|---|---|
| 3,008,682 | 11/1961 | Filliung et al. | 251/26 X |
| 3,035,774 | 5/1962 | Ray | 251/26 X |
| 5,125,621 | 6/1992 | Parsons et al. | 251/45 X |
| 5,853,026 | 12/1998 | Wlodarczyk et al. | 251/30.05 X |

Primary Examiner—Kevin Lee

[57] ABSTRACT

A flush valve includes: a valve body having a diaphragm valve flexibly formed in the valve body communicated with an inlet pipe for supplying inlet water and an outlet pipe connected to a toilet, a urinal or a sprinkler system, a filter and a magnet mounted in the diaphragm valve for filtering out the dirts or rust carried in the water, a limit valve formed in the valve body juxtapositioned to the diaphragm valve for automatically closing the relief vents and passages between the diaphragm valve and the outlet pipe in case of failure of a manual relief valve or an electrically operated relief valve, which controls the opening or closing of the diaphragm valve, with the manual relief valve operatively opening the relief vents or passages at the downstream side of the diaphragm valve in a pre-set time period for timely opening the diaphragm valve, and a self-regulating valve provided in the outlet pipe for automatically maintaining a constant water flow rate when subjected to a fluctuated water pressure in a plumbing system.

10 Claims, 5 Drawing Sheets

RELIABLE FLUSH VALVE

BACKGROUND OF THE INVENTION

A conventional flush valve of a plumbing system as used for flushing a toilet or urinal as shown in FIG. 1 includes: a diaphragm valve F formed in a central portion of a valve body communicated with an inlet pipe I for supplying water W therein, a solenoid S normally closing a valve opening V and operatively opened by a controller having a sensor A when detecting the presence of a person using the toilet or urinal for discharging flush water from the drain pipe D having a listed atmospheric vacuum breaker U mounted therein.

Upon opening of the solenoid valve S, the water W will flow through an orifice O formed in the diaphragm valve F, a valve opening V, and a central opening C in a stem T of the diaphragm valve F to be finally drained through the drain pipe D. The diaphragm stem T is reciprocatively moved and guided in a central hole H recessed in a central body portion, having a sealing ring R retained on the stem T for water sealing.

However, the conventional flush valve of FIG. 1 has the following drawbacks:

1. The sealing ring or O-ring R on the stem T may be easily worn to cause water leakage through the inside wall of the recessed hole H as indicated by dotted line L of FIG. 1 even if the solenoid valve S is normally closed, thereby wasting water and requiring frequent repair and maintenance for the flush valve.
2. The top cap or cover E is merely provided for mounting the solenoid S, the controller A, and batteries B for powering the controller and solenoid S, lacking of an actuating valve for manually operating the flush valve.
3. Without implementing any filtering medium in the valve, the dirt or rust may be accumulated on the core of the solenoid S to retard the movement of the core without closing the valve opening V when needed, thereby being unable to stop flushing automatically.
4. Once the solenoid is out of order, the valve opening V is always opened to cause continuous water drainage and waste water resource.

U.S. Pat. No. 5,295,655 to John R. Wilson disclosed a toilet device flush valve having a movable diaphragm closing upon the valve seat to control flow between the inlet and the outlet, having a handle assembly (16) controlling movement of a plunger (18), a relief valve (42) and the diaphragm (32).

However, when it is intended to flush the toilet, the handle (16) should be continuously operated to actuate the plunger (18) to tilt the relief valve (42) for opening the diaphragm (32). Upon releasing of the handle (16), the water will be immediately stopped to interrupt the flushing for the toilet, causing inconvenient flushing operation or even an incomplete cleaning of the toilet.

The present inventor has found the drawbacks of the conventional flush valve and invented the present reliable flush valve.

SUMMARY OF THE INVENTION

The object of the present invention is to provide a flush valve including: a valve body having a diaphragm valve flexibly formed in the valve body communicated with an inlet pipe for supplying inlet water and an outlet pipe connected to a toilet, a urinal or a sprinkler system, a filter and a magnet mounted in the diaphragm valve for filtering out the dirts or rust carried in the water, a limit valve formed in the valve body juxtapositioned to the diaphragm valve for automatically closing the relief vents and passages between the diaphragm valve and the outlet pipe in case of failure of a manual relief valve or an electrically operated relief valve, which controls the opening or closing of the diaphragm valve, with the manual relief valve operatively opening the relief vents or passages at the downstream side of the diaphragm valve in a pre-set time period for timely opening the diaphragm valve, and a self-regulating valve provided in the outlet pipe for automatically maintaining a constant water flow rate when subjected to a fluctuated water pressure in a plumbing system.

DETAILED DESCRIPTION

Figure 1:
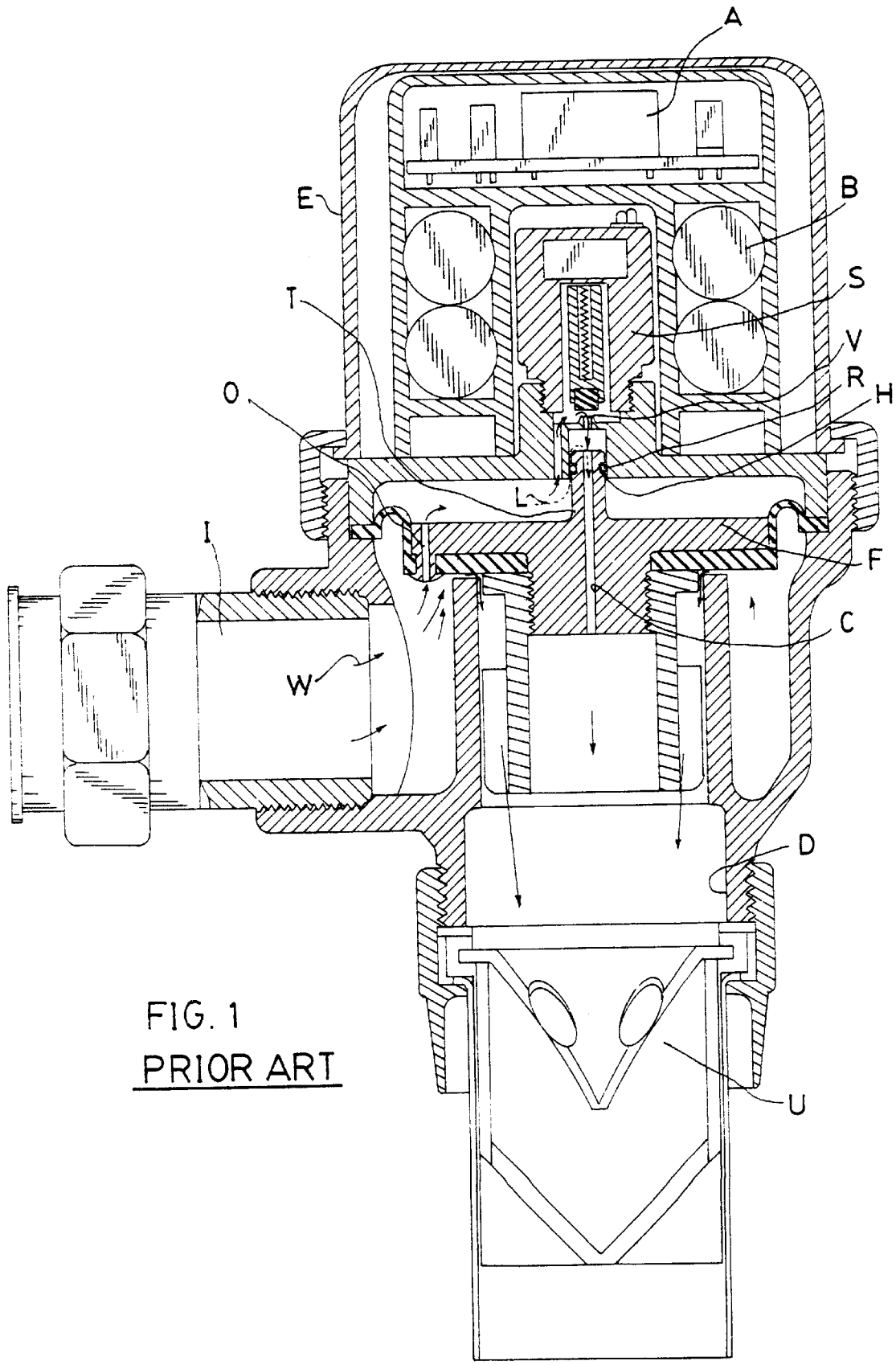
FIG. 1 is a sectional drawing showing a conventional flush valve.

As shown in FIGS. 2–5, a flush valve of a plumbing system comprises: a valve body 1; a diaphragm valve 2 flexibly mounted in the valve body 1; a filter 3 and a magnet 3a provided in the valve body 1 for filtering off dirts, particles and rust carried in the water flow; a limit valve 4 flexibly secured in the valve body 1 and juxtapositioned to the diaphragm valve 2; a manual relief valve 5 and an electrically operated relief valve 6 diametrically mounted on the valve body 1 for respectively controlling the opening of the diaphragm valve in a pre-set time period manually or automatically; a controller 7 mounted on the valve body 1 for controlling the electrically operated relief valve 6; and a self-regulating valve 8 resiliently mounted in an outlet pipe 12 of the flush valve.

The flush valve of the present invention may be provided for flushing a toilet, a urinal, a sprinkler or water-spraying system or any plumbing systems automatically or manually, not limited in the present invention.

The valve body 1 includes: an outer barrel 10 connected with an inlet pipe 11 for supplying water W therein; an outlet pipe 12 having a listed atmospheric vacuum breaker 13 formed on the outlet pipe 12; an inner barrel 14 disposed within the outer barrel 10 having an inlet port 101 defined between the inner and outer barrels 14, 10 and communicated with the inlet pipe 11; an upper cover 15 secured on an upper portion of the outer barrel 10 having the diaphragm valve 2 formed between the upper cover 15 and the inner and outer barrels 14, 10; an upper chamber 16 defined between the diaphragm valve 2 and the limit valve 4; an uppermost chamber 17 defined between the limit valve 4 and the upper cover 15; a top housing 18 secured on a top portion of the valve body 1 above the upper cover 15 for mounting the manual relief valve 5, the electrically operated relief valve 6 and the controller 7 in the top housing 18; and a relief port 19 annularly formed in a peripheral portion of the outer barrel 10 fludically communicated with the uppermost chamber 17 through the manual relief valve 5 and the electrically operated relief valve 6 and having a discharge passage 191 connected between the relief port 19 and the outlet pipe 12.

The diaphragm valve 2 includes: a valve plug 21 secured to a stem 24 and normally rested upon a valve seat 141 formed on an upper edge portion of the inner barrel 14 having a discharge opening 20 defined between the valve plug 21 and the valve seat 141 when the valve plug of the diaphragm valve 2 is opened; a diaphragm 22 circumferentially formed on an upper disk 23 secured to the stem 24 and secured between the upper cover 15 and the outer barrel 10 of the valve body 1; an inlet opening 25 circumferentially formed between the diaphragm 22 and the valve plug 21 to direct water inwardly into an interior 26 formed in a hollow portion of the diaphragm valve 2 from the inlet port 101 annularly formed between the inner barrel 14 and the outer barrel 10; and an releasing hole 231 formed through the upper disk 23 and communicated with the upper chamber 16 between the diaphragm valve 2 and limit valve 4 and communicated with the interior 26 of the diaphragm valve 2.

The filter 3 is retained in the interior 26 of the diaphragm valve 2 between the inlet opening 25 and the releasing hole 231 for filtering off dusts, particles or dirts carried or laden in the water flow W from the inlet pipe 11. The filter 3 may be made of stainless steel net, fibrous materials, or any other filter media, not limited in the present invention.

The magnet 3a may be formed as a collar jacketed on the stem 24 of the diaphragm valve 2 for magnetically attracting ferrous dirt materials such as rust (or the like) carried in the water flow to prevent the accumulation of rust on a core of a solenoid of the electrically operated relief valve 6. The magnet 3a may also be formed as other shapes or structures to be secured in a water passage within the diaphragm valve 2.

The limit valve 4 includes: an upper diaphragm 40 having a flange 41 of the upper diaphragm circumferentially secured within the upper cover 15 and positioned in between the upper chamber 16 adjacent to the diaphragm valve 2 and the upper cover 15, a plug portion 42 having a central opening 43 formed through the plug portion 42, with the plug portion 42 operatively engageable with a central socket 151 formed in a central portion of the upper cover 15 for closing the central opening 43 of the limit valve 4 when the manual relief valve 5 is continuously opened or the electrically operated relief valve 6 is accidentally opened such as being out of order either mechanically or electrically.

Figure 2:
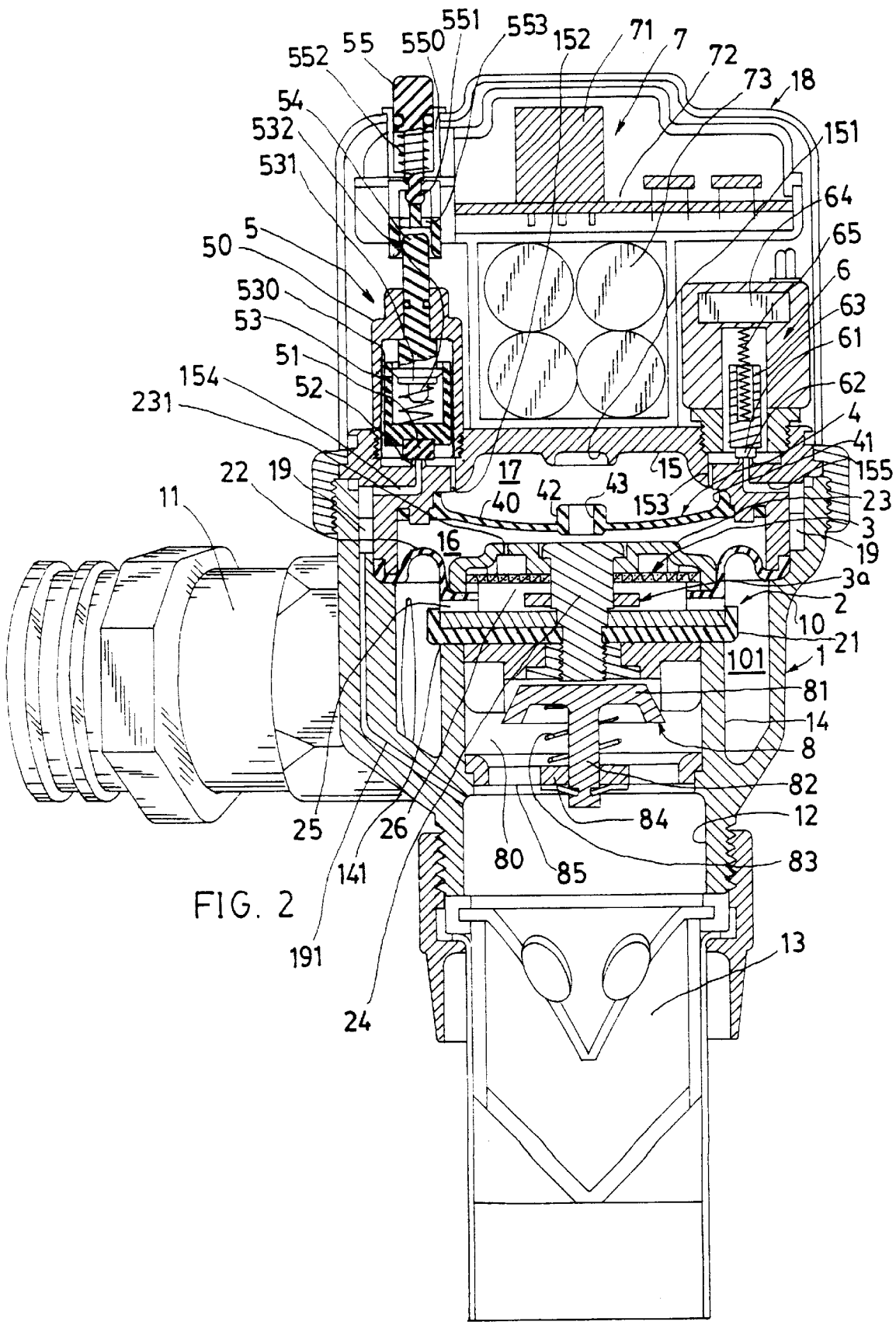
FIG. 2 is a sectional drawing of the present invention when normally closed.

The manual relief valve 5 includes: a relief valve plug 51 normally closing a first relief valve opening 154 formed in a relief valve seat 52 formed on one side portion of the upper cover 15, a plunger 53 secured with the relief valve plug 51 and reciprocatively held in a valve housing 50 formed in one side portion of the top housing 18 of the valve body 1, a relief chamber 5a defined in the valve housing 50 and fluidically communicated, through a first relief vent 152 formed in the upper cover 15, with the uppermost chamber 17 defined between the upper cover 15 and the limit valve 4, an aperture 530 defined between the plunger 53 and the valve housing 50, a piston 531 slidably held in the plunger 53 having a follower rod 54 protruding outwardly (or upwardly) from the piston 531 to be depressed by a push button 55 which is protruded outwardly from the top housing 18 for depression on the push button 55, and a tension spring 532 retained between the piston 531 and the plunger 53 adjacent to the relief valve plug 51 for normally urging the valve plug 51 for closing the valve seat 52 and valve opening 154 (FIG. 2).

The push button 55 includes: a tension spring 552 held in a button casing 550 fixed in the top housing 18 for normally urging the push button outwardly (upwardly) to be depressed by a user's finger, a pushing rod 551 protruding from the push button towards the follower rod 54 of the manual relief valve 5, and a depression member 553 coupled with the pushing rod 551 for depressing the follower rod 54 upon depression on the push button 55 for opening the valve plug 51 (from FIG. 2 to FIG. 3) in order for opening the diaphragm valve 2.

The electrically operated relief valve 6 may be a solenoid valve or any other electrically operated valve which is controlled by a controller 6 mounted in the top housing 18, including a sensor 71 for detecting the presence of a user approaching the flush valve, a control circuit 72 including an integrated circuit pre-recorded with programs such as timing period or any other functional control operation modes, and a power source 73 including a plurality of batteries. The controller 7 and solenoid valve is a conventional art and not described in detail herewith.

The electrically operated relief valve 6 and the manual relief valve 5 are diametrically disposed on opposite side portions in the top housing 18 for economically utilizing the space or volume in the housing 18 to form a compact unit together with the valve body 1 of the present invention.

The electrically operated relief valve 6 as shown in the drawing figures may be a conventional electromagnetic relief valve and includes: a valve plug 61 normally closing a second relief valve opening 155 formed in a valve seat 62 formed on another side portion of the upper cover 15, a core 63 resiliently retained on a tension spring 65 for normally urging the core and the plug 61 for closing the valve opening 155, and a magnet 64 magnetically attracting the core 63 for opening the valve plug 61 when automatically actuated by the sensor 71 of the controller 7 for opening the valve opening 155 in order to be fluidically communicated with a second relief vent 153 which is formed in the upper cover 15 and communicated with the uppermost chamber 17 for releasing water from the uppermost chamber 17 through the relief vent 153, the relief valve opening 155 and the relief port 19.

The self-regulating valve 8 includes: a valve disc 81 formed on a valve stem 82 resiliently and slidably held on a holder 84 by a tension spring 83, with the holder 84 formed with at least a discharge opening 85 therein and retained in the outlet pipe 12 at a downstream of the diaphragm valve 2; and an annular port 80 defined between the disk 81 and the outlet pipe 12, with the annular port 80 tapered towards the outlet pipe 12 for decreasing an annular area thereof; whereby upon actuation by a high pressure of water streamflow on the valve disk 81, the disk 81 will be forced (downwardly) towards the downstream to decrease the area of the annular port 80 to thereby maintain a constant flow rate of water. After the high pressure "surge" disappears, the tension spring 83 will restore the valve disk 81 upwardly to recover the port area.

Figure 3:
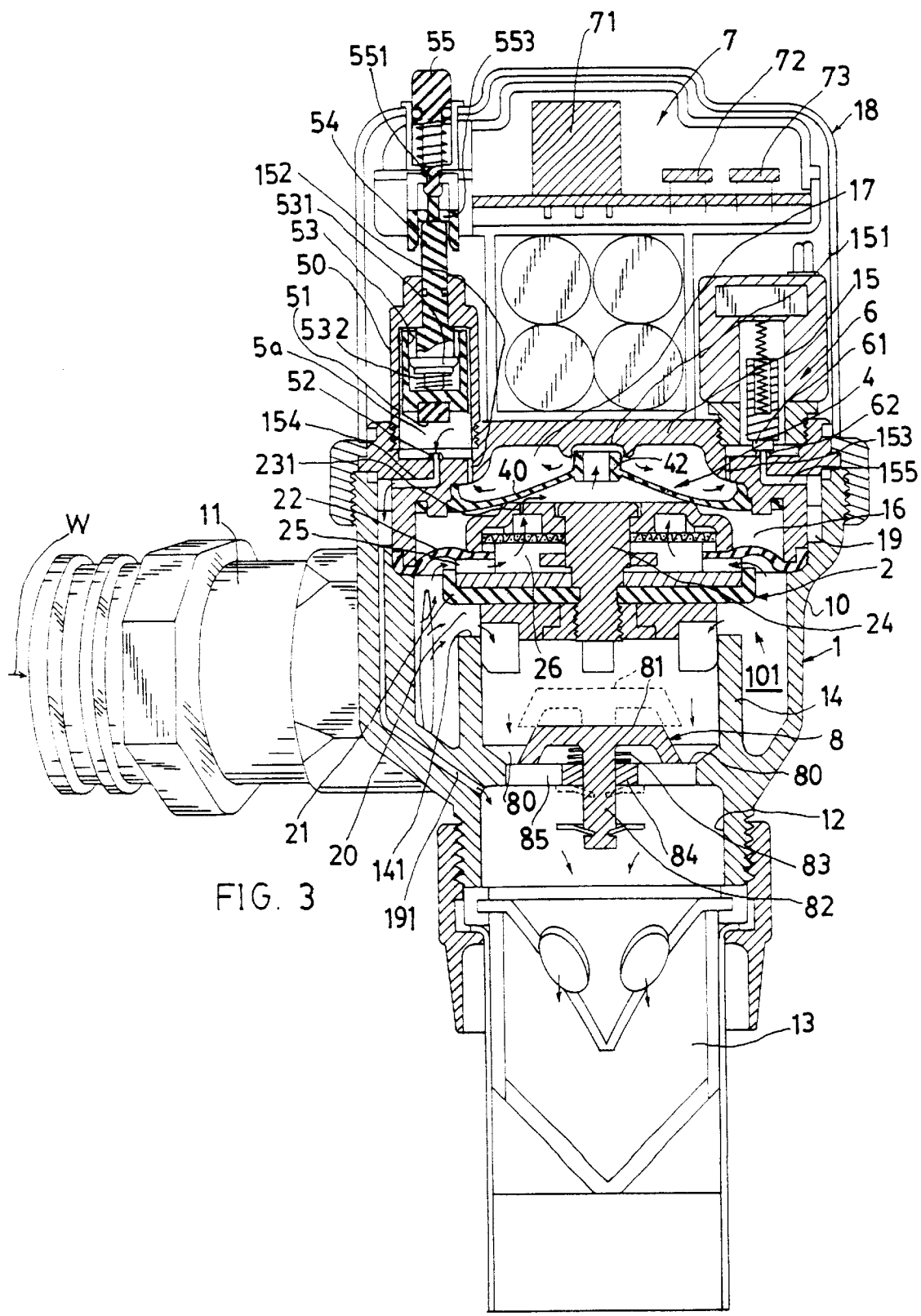
FIG. 3 shows an opened valve of the present invention for flushing purpose.

When using the present invention manually (FIG. 2–FIG. 3), the push button 55 is downwardly depressed to lower the follower rod 54 to push the piston 531 downwardly to squeeze the fluid in the plunger 53 outwardly through the aperture 530 between the plunger 53 and the valve housing 50 into the chamber 17 through the relief vent 152; and while the push button 55 is released from the user's depression, the water pressure will urge the piston 531 upwardly (also to compress the spring 532) as shown in FIG. 3 to open the valve seat and valve opening 154 to release the pressure and discharge the water through the port 19, passage 191 and outlet pipe 12.

Once the pressure at the downstream side (in chamber 16, 17) of the diaphragm valve 2 is decreased, the diaphragm valve 2 will be opened to open the discharge opening 20 to allow the water W from the inlet pipe 11 to be drained into outlet pipe 12 through the opening 20 for flushing use.

Figure 4:
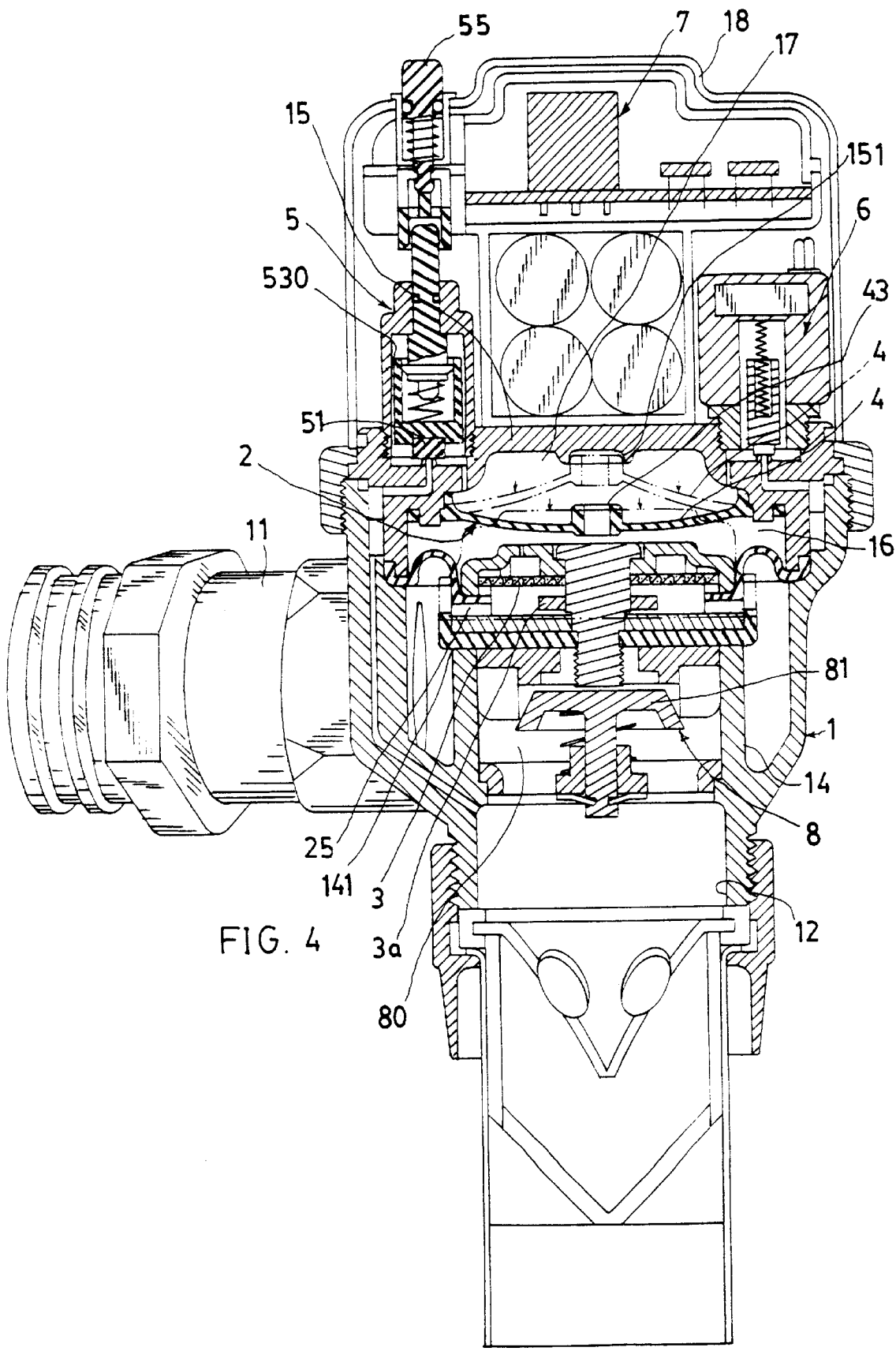
FIG. 4 shows a closed valve of the present invention when restored from the opening state as shown in FIG. 3.

The compressed tension spring 532 will be gradually restored to lower the plug 51 to re-close the valve seat 52 and opening 154. The water will continuously flow into the chambers 16, 17 through the inlet opening 25, the releasing hole 231 of the diaphragm valve 2 and through the central opening 43 of the limit valve 4 to maintain an equilibrium below and above each diaphragm 22 or 40. The flexible diaphragm 40, 22 will then be restored automatically as shown in FIG. 4 (from dotted line to solid line) and the diaphragm valve 2 will be closed to close the discharge opening 20 to stop water flushing.

The flushing time duration depends upon a pre-set time period which may be varied with the resilience of the tension spring 532, the apertures of the relevant moving elements of the relief valve 5, the diameters of vent 152 and valve opening 154, and so on.

For automatic flushing, the sensor 71 of the controller 7 will detect the presence of a user to open the solenoid valve 6 to open the valve opening 155 to release pressure and discharge water in the chamber 17, 16 through the vent 153, the opening 155, the port 19 and the passage 191, and the outlet pipe 12. The diaphragm valve 2 will then be opened for flushing a toilet, an urinal or other plumbing systems.

The flushing time period is preset by the controller 7. When the time is lapsed, the valve 6 is closed and the diaphragm valve will also be closed to stop the flushing operation.

The controller 7 may be designed to have pre-programmable timing sequence for periodically or intermittently opening the valve. Then, the present invention may be provided for an automatic sprinkler system such as for gardening or other uses.

Figure 5:
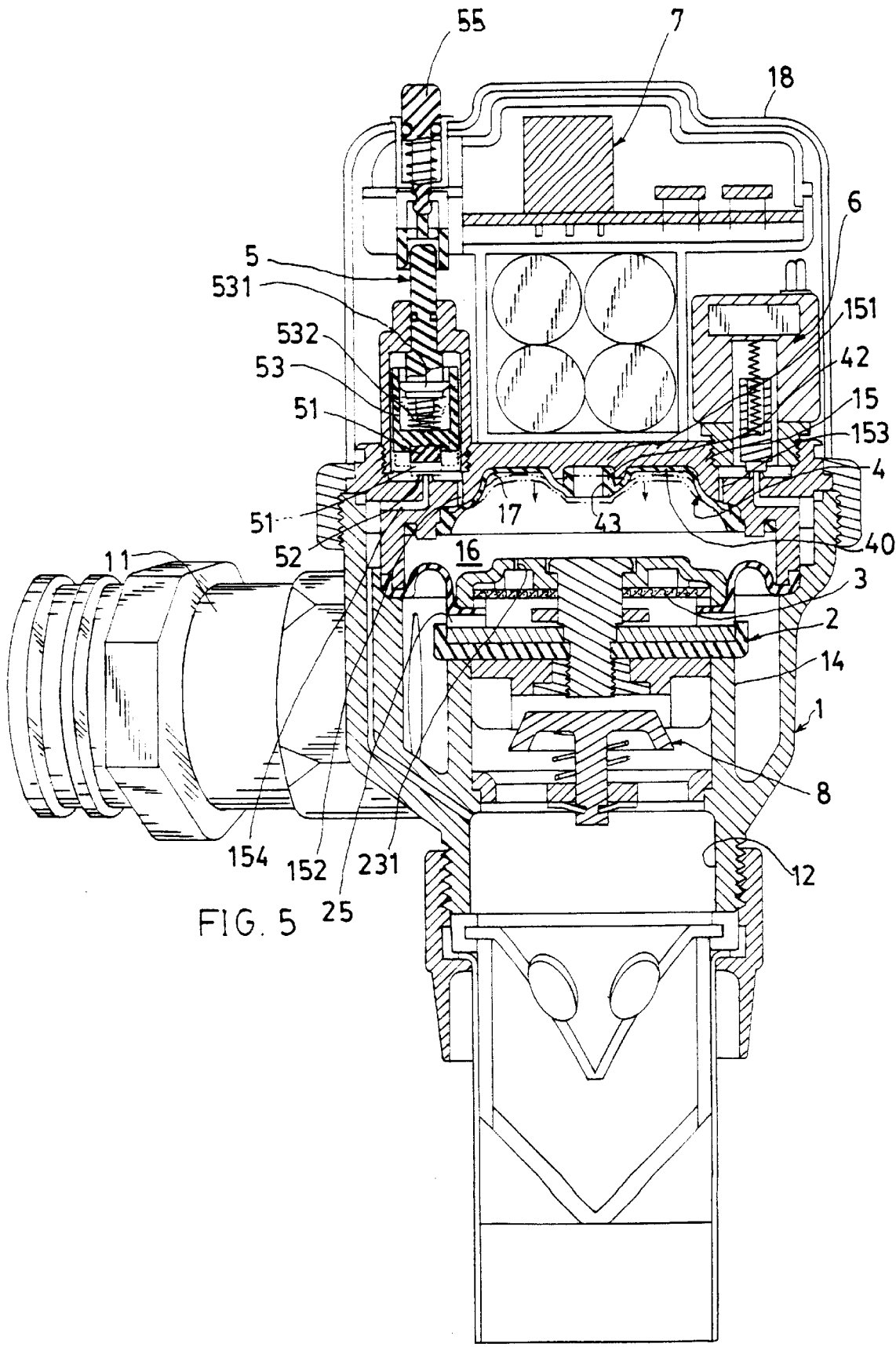
FIG. 5 is an illustration showing an automatic closing of the relief vents by the limit valve of the present invention.

If either manual relief valve 5 or electrically operated relief valve 6 is accidentally out of order and can not be automatically closed, the water pressure at the uppermost chamber 17 above the limit valve 4 will be exhausted and the water pressure in the chamber 16 will urge the upper diaphragm 40 of the limit valve 4 upwardly to engage the plug portion 42 with the socket 151 in the upper cover 15 to close the opening 43 and to seal the first and second relief vents 152, 153 as shown in FIG. 5, thereby stopping unexpected water flow through the valve openings 154, 155 of the two relief valves 5, 6 for preventing water loss. If the manual valve 5 is intentionally opened such as by continuously depressing the push button 55, the limit valve 4 will close the relief vents (152,153) as aforesaid to prevent unexpected water loss (also shown in FIG. 5).

When the valve 5 is repaired or recovered to reclose the valve plug 51 on the seat 52, the push button 55 may be depressed several times to initiate a restoring of the diaphragm 40 of the limit valve 4 to direct a water flow passage through the opening 43, the chamber 17, the vent 152 as dotted line shown in FIG. 5. The elasticity and flexibility of the diaphragm 40 will then be automatically restored to be an equilibrium state as shown in FIG. 2 ready for next actuation of the valve 5.

The present invention is superior to a conventional plumbing flush valve with the following advantages:
1. A manual relief valve 5 is provided to actuate the opening of the diaphragm valve at a pre-set time interval. Then, the valve will be automatically re-closed without any electrical energy or means.
2. Both manual relief valve 5 and the electrically operated relief valves 6 are diametrically disposed on opposite ends of the housing and valve body; and the water as discharged from the relief valves 5, 6 is downwardly drained through the annular port circumferentially formed in an outer body portion by eliminating the sealing ring R as retained on the central diaphragm stem T of the conventional flush valve (FIG. 1), thereby solving the wearing and water leakage problem of the conventional diaphragm valve F.
3. Filter 3 and magnet 3a are provided for filtering off dirts and rust carried in the water flow.
4. The limit valve 4 will automatically close the relief passages of the two relief valves, ensuring the closing of the diaphragm valve for preventing water loss when the relief valve 5 or 6 is damaged and not closed.
5. The self-regulated valve 8 will maintain a constant flow rate for the water drained into outlet pipe.

The present invention may be further modified without departing from the spirit and scope of this invention.

I claim:

1. A flush valve comprising:

a valve body (1) having an inlet pipe (11) for supplying water therein and an outlet pipe (12) for draining water therefrom for flushing use;

a diaphragm valve (2) flexibly formed in said valve body (1) between said inlet pipe (11) and said outlet pipe (12); said diaphragm valve (2) normally closing said outlet pipe (12);

a filter (3) and a magnet (3a) provided in said diaphragm valve (2) for filtering off dirts and rust as carried in a water flow through said valve;

a limit valve (4) flexibly formed in the valve body (1) between an upper cover (15) of said valve body (1) and said diaphragm valve (2);

a manual relief valve (5) and an electrically operated relief valve (6) disposed on opposite side portions on said upper cover (15) of said valve body (1), and operatively communicated with a chamber between said upper cover (15) of said valve body (1) and said diaphragm valve (2) through two relief vents (152, 153) formed in said upper cover (15), and said two relief valves (5, 6) communicated with said outlet pipe (12) through a relief port (19) circumferentially formed in said valve body; with said electrically operated relief valve (6) actuated by a controller (7) mounted on said valve body (1); and a self-regulating valve (8) resiliently held in said outlet pipe (1) for maintaining a constant flow rate of a flushing water drained through said self-regulating valve (8) and said outlet pipe (12);

whereby upon manual actuation of said manual relief valve (5) or upon automatic actuation of said electrically operated relief valve (6) to open either said relief valve (5, 6), the water pressure and water in said chamber between said diaphragm valve (2) and said upper cover (15) will be released through said relief port (19) and outlet pipe (12) to open the diaphragm valve (2) for draining water through said outlet pipe (12) in a pre-set time period as pre-set in either said relief valve (5, 6); and either said relief valve (5, 6) and said diaphragm valve (2) will be re-closed upon lapse of the pre-set time period; and upon a constant opening of either said relief valve (5, 6), said limit valve (4) will automatically close said vents (152, 153) to stop water loss as released therethrough.

2. A flush valve according to claim 1, wherein said valve body (1) includes: an outer barrel (10) connected with said inlet pipe (11) for supplying water therein; an inner barrel (14) disposed within the outer barrel (10) having an inlet port (101) defined between the inner and outer barrels (14, 10) and communicated with the inlet pipe (11); said upper cover (15) secured on an upper portion of the outer barrel (10) having the diaphragm valve (2) formed between the upper cover (15) and the inner and outer barrels (14, 10); an upper chamber (16) defined between the diaphragm valve (2) and the limit valve (4); an uppermost chamber (17) defined between the limit valve (4) and the upper cover (15); a top housing (18) secured on a top portion of the valve body (1) above the upper cover (15) for mounting the manual relief valve (5), the electrically operated relief valve (6) and the controller (7) in the top housing (18); and said relief port (19) annularly formed in a peripheral portion of the outer barrel (10) and fludically communicated with the uppermost chamber (17) through the manual relief valve (5) and the electrically operated relief valve (6) and having a discharge passage (191) connected between the relief port (19) and the outlet pipe (12).

3. A flush valve according to claim 2, wherein said diaphragm valve (2) includes: a valve plug (21) secured to a stem (24) and normally rested upon a valve seat (141) formed on an upper edge portion of the inner barrel (14) having a discharge opening (20) defined between the valve plug (21) and the valve seat (141) when the valve plug of the diaphragm valve (2) is opened; a diaphragm (22) circumferentially formed on an upper disk (23) secured to the stem (24) and secured between the upper cover (15) and the outer barrel (10) of the valve body (1); an inlet opening (25) circumferentially formed between the diaphragm (22) and the valve plug (21) to direct water inwardly into an interior (26) formed in a hollow portion of the diaphragm valve (2) from the inlet port (101) annularly formed between the inner barrel (14) and the outer barrel (10); and an releasing hole (231) formed through the upper disk (23) and communicated with the upper chamber (16) between the diaphragm valve (2) and limit valve (4) and communicated with the interior (26) of the diaphragm valve (2).

4. A flush valve according to claim 3, wherein said diaphragm valve (2) has a filter (3) retained in the interior (26) of the diaphragm valve (2) between the inlet opening (25) and the releasing hole (231) for filtering off dirts carried in the water flow from the inlet pipe.

5. A flush valve according to claim 3, wherein said diaphragm valve (2) has a magnet (3a) formed as a collar jacketed on the stem (24) of the diaphragm valve (2) for magnetically attracting rust carried in a flushing water flow.

6. A flush valve according to claim 2, wherein said limit valve (4) includes: an upper diaphragm (40) having a flange (41) of the upper diaphragm circumferentially secured within the upper cover (15) and positioned in between the upper chamber (16) adjacent to the diaphragm valve (2) and the upper cover (15), a plug portion (42) having a central opening (43) formed through the plug portion (42), with the plug portion (42) operatively engageable with a central socket (151) formed in a central portion of the upper cover (15) for closing the central opening (43) of the limit valve (4) when the manual relief valve (5) is continuously opened or the electrically operated relief valve (6) is accidentally opened.

7. A flush valve according to claim 2, wherein said manual relief valve (5) includes: a relief valve plug (51) normally closing a first relief valve opening (154) formed in a relief valve seat (52) formed on one side portion of the upper cover (15), a plunger (53) secured with the relief valve plug (51) and reciprocatively held in a valve housing (50) formed in one side portion of the top housing (18) of the valve body (1), a relief chamber (5a) defined in the valve housing (50) and fluidically communicated, through a first relief vent (152) formed in the upper cover (15), with the uppermost chamber (17) defined between the upper cover (15) and the limit valve (4), an aperture (530) defined between the plunger (53) and the valve housing (50), a piston (531) slidably held in the plunger (53) having a follower rod (54) protruding outwardly from the piston (531) to be depressed by a push button (55) which is protruded outwardly from the top housing (18) for depression on the push button (55), and a tension spring (532) retained between the piston (531) and the plunger (53) adjacent to the relief valve plug (51) for normally urging the valve plug (51) for closing the valve seat (52)and valve opening (154).

8. A flush valve according to claim 7, wherein said push button (55) includes: a tension spring (552) held in a button casing (550) fixed in the top housing (18) for normally urging the push button outwardly to be depressed by a user's finger, a pushing rod (551) protruding from the push button towards the follower rod (54) of the manual relief valve (5), and a depression member (553) coupled with the pushing rod (551) for depressing the follower rod (54) upon depression on the push button (55) for opening the valve plug (51).

9. A flush valve according to claim 1, wherein said electrically operated relief valve (6) is a solenoid valve including: a valve plug (61) normally closing a second relief valve opening (155) formed in a valve seat (62) formed on one side portion of the upper cover (15), a core (63) resiliently retained on a tension spring (65) for normally urging the core and the plug (61) for closing the valve opening (155), and a magnet (64) magnetically attracting the core (63) for opening the valve plug (61) when automatically actuated by a sensor (71) of the controller (7) for opening the valve opening (155) and for opening the diaphragm valve (2).

10. A flush valve according to claim 1, wherein said self-regulating valve (8) includes: a valve disc (81) formed on a valve stem (82) resiliently and slidably held on a holder (84) by a tension spring (83), with the holder (84) formed with at least a discharge opening (85) therein and retained in the outlet pipe (12) at a downstream of the diaphragm valve (2); and an annular port (80) defined between the disk (81) and the outlet pipe (12), with the annular port (80) tapered towards the outlet pipe (12) for decreasing an annular area thereof; whereby upon actuation by a high pressure of a flushing water flow on the valve disk (81), the disk (81) will be forced towards the downstream to decrease the area of the annular port (80) to thereby maintain a constant flow rate of flushing water.

\* \* \* \* \*